Dec. 15, 1953  E. WILDHABER  2,662,381
UNIVERSAL JOINT
Filed Dec. 14, 1949  4 Sheets-Sheet 1

INVENTOR.
ERNEST WILDHABER
BY
ATTORNEY

Dec. 15, 1953
E. WILDHABER
2,662,381
UNIVERSAL JOINT
Filed Dec. 14, 1949
4 Sheets-Sheet 2
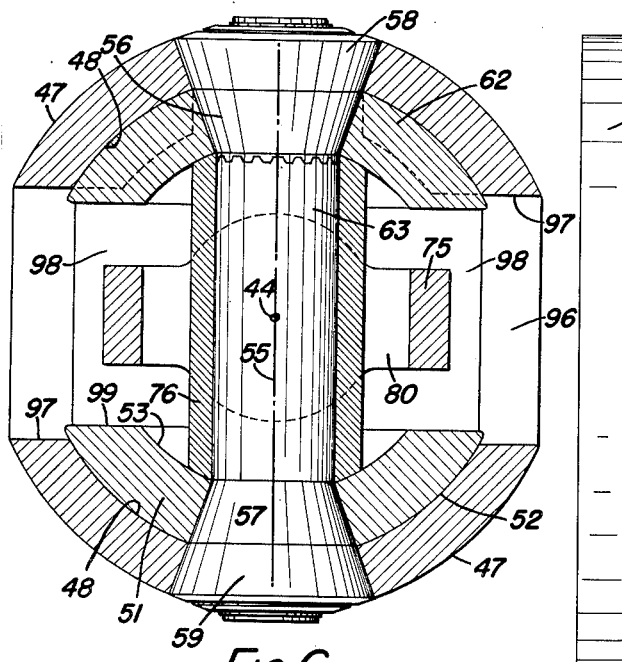
FIG. 6.
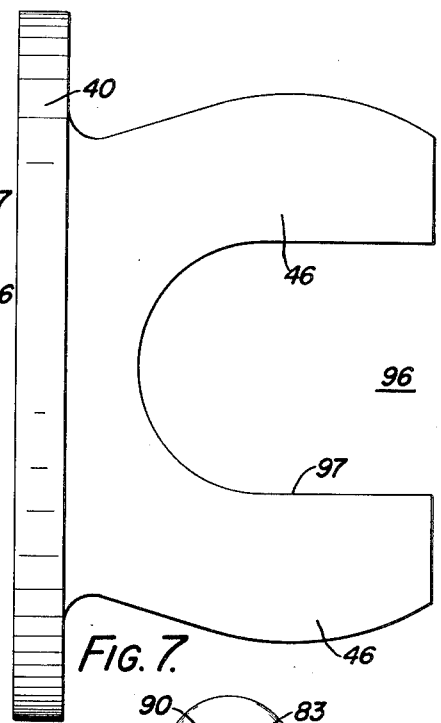
FIG. 7.
FIG. 8.
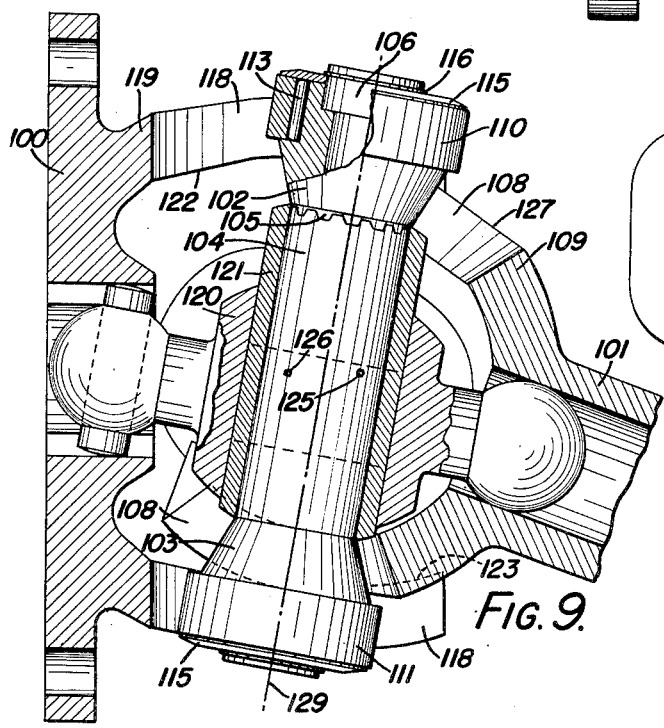
FIG. 9.
INVENTOR.
ERNEST WILDHABER
BY
ATTORNEY Dec. 15, 1953 E. WILDHABER 2,662,381
UNIVERSAL JOINT
Filed Dec. 14, 1949 4 Sheets-Sheet 4

INVENTOR.
ERNEST WILDHABER
BY
ATTORNEY

Patented Dec. 15, 1953

2,662,381

UNITED STATES PATENT OFFICE 2,662,381

UNIVERSAL JOINT

Ernest Wildhaber, Brighton, N. Y.

Application December 14, 1949, Serial No. 132,953

19 Claims. (Cl. 64—21)

The present invention relates to universal joints of the uniform motion type which are also known as constant velocity type joints. More particularly, the invention relates to joints of this type in which the motion between the two parts, which are connected by the joint, is transmitted through rolling members which are constrained to remain in a plane bisecting the angle between the axes of the two connected parts and passing through the point of intersection of said axes. The rolling members may be conical rollers, cylindrical rollers, or balls.

In known uniform motion joints of the character referred to, the rolling members not only roll but slide. Ordinarily they slide in a direction perpendicular to their line of contact. Moreover, the sliding is substantial, I have found; and the sliding occurs even though balls be employed in the joint, although it is ordinarily assumed that a ball will have pure rolling motion. The sliding causes wear and heating, and necessitates repair or replacement of the parts of the joint from time to time.

One object of the present invention is to provide a uniform motion universal joint employing rollers to transmit the motion between the parts connected by the joint but in which sliding of the rollers is avoided.

Another object of the invention is to provide an improved universal joint of the uniform motion type which requires neither repair or replacement during the life of the automotive vehicle or machine upon which the joint is used.

A further object of the invention is to provide a uniform motion universal joint of high load capacity and of simple design.

Other objects of the invention will appear hereinafter from the specification and from the recital of the appended claims.

In the drawings:

Fig. 1 is a diagrammatic view showing the action of a uniform motion type roller joint of conventional design;

Figs. 2 to 4 inclusive are diagrammatic views showing various relative positions of the joint members and indicating the corresponding rates of sliding, Fig. 2 showing the parts of the joint in a position moved through an angle θ from Fig. 1, Fig. 3 showing the parts when the joint is turned through an angle θ equal to 90°, and Fig. 4 showing the parts when the joint is turned through an angle θ equal to 180°;

Fig. 6 is a midsection through this joint in a plane perpendicular to the joint axes with the rollers shown in view and with the joint axes shown in alignment;

Fig. 7 is an elevational view of one of the elements of the joint;

Fig. 8 is a view taken at right angles to Fig. 6 and showing the member for maintaining the rollers in a given plane and the member which connects this member with the rod that carries the rollers;

Fig. 9 is a view partly in axial section and partly in elevation of a modified form of universal joint made according to this invention;

Figure 1:
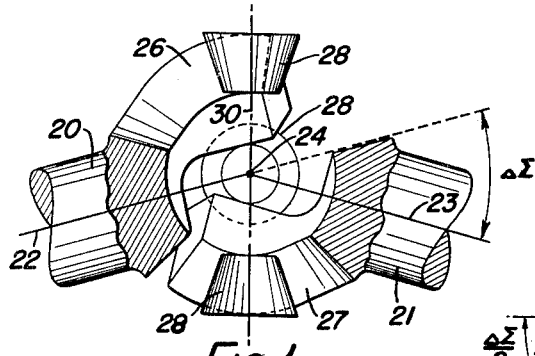

Referring now to the drawings by numerals, I have shown in Fig. 1 a conventional type of universal joint in which rollers are used to transmit motion between the connected parts. Here 20 ad 21 denote the two shafts or other elements which are operatively connected by the joint. The axes of these elements are designated 22 and 23, respectively. These axes include an angle $\Delta_e$ with each other; and they intersect at 24.

The elements 20 and 21 have arms or prongs 26 and 27, respectively, each element having two prongs diametrically opposed to one another. Only one prong of each element is shown in Fig. 1, the other being broken away. Interposed between the opposed side surfaces of adjacent prongs of the end elements are rollers 28. There are four such rollers of which three are shown in Fig. 1, the top roller being omitted. Each roller contacts with the opposed side surfaces of two adjacent prongs belonging to the two end elements, respectively. The rollers 28 here shown are conical. The rollers are arranged in pairs. The two rollers of a pair are diametrically disposed and have a common axis 30. This axis is constrained to move in a plane which bisects the shaft angle 22—24—23 of the axes 22, 23 and which passes through the intersection point 24 of these axes. Various means are used in conventional joints of this character for constraining the axis of the rollers in this manner but such means have not been illustrated in the diagram for reasons of clarity.

Figure 2:
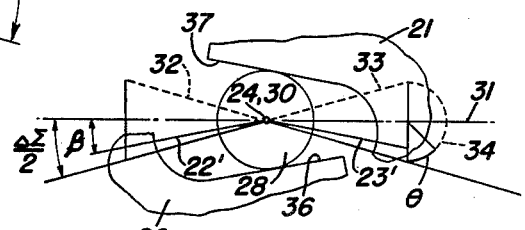
Figure 3:
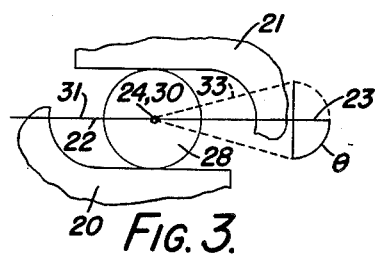
Figure 4:
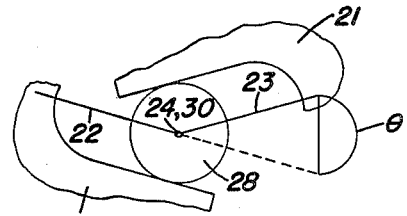

As stated above, I have found that there is considerable sliding of the rollers in conventional types of joints of this character. To determine the amount of sliding we must look along the axis 30 of a roller 28 and we must determine the motions of the other parts relative to the roller axis. In ordinary operation, the elements 20 and 21 turn equally on their axes 22 and 23, which will here be assumed to remain for a while in fixed positions. In ordinary operation, also the axis 30 of the rollers moves in the bisecting plane about the center 24, that is, it moves about an axis 31 (Fig. 2) perpendicular to the bisecting plane and passing through the point 24. In Figs. 2, 3 and 4, the motion of one roller 28, namely, the top roller of the joint, is considered. To look along the axis 30 of this top roller 28, the whole assembly of parts is turned back about the axis 31 until the axis 30 of this roller 28 is perpendicular to the drawing plane and extends in the direction of view. In this motion the axes 22 and 23 are moved equally about the axis 31 and describe conical surfaces 32 and 33, respectively, about that axis. These conical surfaces are identical and one can be considered a continuation of the other. Their cone angle is $\frac{1}{2}\Delta\epsilon$ and their included angle is $\Delta\epsilon$. In this motion relative to the axis 30 of one roller, the roller guides of the elements 20 and 21, that is, the sides 36 and 37 of the prongs 26 and 27, stay continuously tangent to the considered roller 28.

Fig. 2 shows an intermediate position with the axes 22 and 23 equally inclined to the drawing plane and projected as lines 22', 23'. These include equal angles $\beta$ with axis 31. The circle 34 shown at the right in Fig. 2 indicates the base of cone 33 and shows the turning position considered. $\theta$ is the turning angle of the roller axis 30 about axis 31 when the joint moves on fixed axes 22, 23. Fig. 3 indicates the relative positions of the two members at a 90° turning angle, that is, where $\theta$ is 90°. Fig. 4 shows the relative positions at a turning angle of 180°.

The instantaneous relative motion of the elements 20, 21 with respect to the considered roller axis 30 can be resolved into two components. One component is an instantaneous turning motion about the roller axis 30. The other is an instantaneous motion about an axis lying in the drawing plane, that is, in the central plane perpendicular to the roller axis 30. This latter motion turns the axes 22 and 23 equally up or equally down from the drawing plane. This component motion tends to turn the rollers 28 in the same direction at both points of their contact with the sides of the arms 26 and 27. It produces rolling. The component motion about the roller axis 30 tends to turn the rollers in opposite directions at the two contacts. It causes sliding.

Thus sliding through an angle equal to $\frac{1}{2}\Delta\epsilon$ occurs in going from the position of Fig. 3 to the one of Fig. 4 if the rollers favor neither side. Of course, the rollers might slide more on one side and less on the other while keeping the same average amount of sliding.

Sliding is measured as an arc on the roller periphery. The angle of sliding between any two adjacent positions is equal to the change in direction of the projected axes 22 and 23. It is the change of the angle $\beta$. As axis 22 and 23 describes its cone 32 or 33 once per turn, its projection moves back and forth once between its end position and describes a total angle $2\Delta\epsilon$. It is thus demonstrated that the average amount of sliding in each of the two contacts, per turn, is an arc of $2\Delta\epsilon$, measured on the roller periphery. $\Delta\epsilon$ is the shaft angularity, see Fig. 1. This sliding is by no means negligible. It means wear and tear, the more so because of the line contact between the rollers and the contacting sides of the prongs and the accompanying high stresses. My invention does away with sliding completely.

The invention relates to the type of uniform motion universal joint which uses rollers having radial axes, such as axis 30, where the grooved portion of one end element is disposed outside of the grooved portion of the other end element and surrounds it. Furthermore, in a joint made according to this invention the working surfaces of the rollers used ordinarily have a substantially straight profile in an axial section. In other words, the working surfaces of the rollers are substantially conical or substantially cylindrical surfaces.

In a joint constructed according to the present invention pairs of coaxial rollers are used to transmit motion between the members connected by the joint. The two rollers of a pair are rotatable relative to one another; and one roller of a pair contacts with one end element of the joint while the other roller of the pair contacts with the other end element of the joint. Moreover, one roller is preferably journalled on the other.

In the embodiment of the invention illustrated in Figs. 5 to 8 inclusive, 40 and 41 denote the two end elements of the universal joint. Their axes are designated at 42 and 43, respectively, and intersect in the point 44. The arms or prongs 46 of the element 40 have an outer spherical surface 47 and an inner spherical surface 48 both centered in the point 44. The arms or prongs 51 of the element 41 have an outer spherical surface 52 and an inner spherical surface 53 both also centered in the point 44. The outside spherical surface 52 fits inside the spherical surface 48, that is, the sphere radii are substantially equal. The prongs of the element 40 therefore surround the prongs of the element 41.

In this embodiment of the invention a single roller axis 55 is employed. The two elements of the joint are connected by rolers 56, 57, 58 and 59 which have a common axis at 55. These rollers are all conical.

The rollers 56 and 57 are equal and opposite and engage in axially extending grooves 61 of the prongs 51 of the member 41. These two rollers 56 and 57 are rigidly connected to one another. One of these rollers may be integral with the rod or bar 63 and the other roller 56 may be secured to this rod or bar by a toothed face coupling 65 of conventional construction. This coupling may be held in tight engagement by means of a bolt 66 which threads into the rod 63. The conical surfaces of rollers 56 and 57 are coaxial and have a common apex 44.

The rollers 56 and 57 are capable of rolling on one side or the other of the grooves 61 in the arms 51 depending on the direction of load. The groove sides are essentially conical surfaces. The two sides of a groove are coaxial surfaces whose axis is perpendicular to the roller axis. The grooves constrain the roller axis 55 to swing about the apex 44 in an axial plane of the element 41 containing these grooves. As the roller axis 55 swings about apex 44 both rollers 56 and 57 roll on the corresponding groove sides.

The outer conical rollers 58 and 59 are journalled on the rollers 56 and 57 coaxially therewith. The outer conical rollers are mounted to be free to rotate relative to the rollers 56 and 57. This freedom of relative rotation is a particular feature of the invention. The rollers 58 and 59 are mounted on conical projections 68 and 69 integral with or otherwise rigidly connected to the rod 63 and may be mounted on the rollers 56 and 57 by means of conical anti-friction rollers or needles 67. For simple assembly the outside diameter of the projections 68 and 69 should be smaller than or equal to the inside diameters of the rollers 58 and 59 at their small ends. Disks 70 serve to hold the rollers in place. These disks are secured axially to the rod 63 by snap rings 71.

The rollers 58 and 59 engage the sides of the grooves 72 in the arms or prongs 46 of the element 40. The two sides of a groove 72 are coaxial. Their common axis is perpendicular to the axis 42 of element 40 and also perpendicular to the roller axis 55. The grooves 72 constrain the roller axis to move about the apex 44 in an axial plane of the element 40. They are essentially conical surfaces such as may be described and enveloped by a conical roller surface when its axis is swung about apex 44 in a plane containing the axis 42 of element 40.

The joint particularly illustrated in Figs. 5 to 8 inclusive is of the axially fixed type and has no relative axial displacement. The two elements engage each other with their spherical surfaces 48 and 52 which form a ball joint. To assemble the joint, the two members of the joint are brought into engagement with one another axially while one element is turned on its axis relatively to the other so that the spherical surface portions 48 and 52 are aligned with the grooves of the mate member of the joint. Thereafter the said element is turned back to bring the grooves into alignment with the grooves of the mate.

To secure uniform motion, means are provided to keep the roller axis 55 in the plane which bisects the angle between the two axes 42 and 43 and which passes through the apex 44. In this embodiment of the invention this constraining means comprises a member 75 and the cooperating member 76. The latter is rectangular in cross section (Fig. 8) and has a central circular bore which is adapted to receive the rod 63. It has spherical surfaces 77 and 78 (Fig. 5) at its opposite ends which are centered at the apex 44 and which fit the inside spherical surface 53 of the prongs 51 of element 41. Through this fit they keep the roller axis passing through the apex 44.

The member 75 has a rectangular slot 80 (Fig. 8) in it in which the member 76 is adapted to slide. This member 75 has at opposite ends two spherical ball-like portions 81 and 82. The rectangular hole 80 has plane sides perpendicular to the line connecting the centers 83 and 84 of the projections 81 and 82. These sides are equally distant from the adjacent sphere centers and are preferably broached. They engage the plane sides of the member 76. Since the two sides 85 and 86 of the member 76 have the same distance from the the apex 44, the engagement of the member 75 with these sides keeps the member 75 in a central position with the sphere centers 83 and 84 at the same distance from the apex 44. The connecting line of the sphere centers is then equally inclined to the axes 42 and 43 and is perpendicular to the bisecting plane 87 which contains roller axis 55. The described means, therefore, keep the roller axis 55 in the bisecting plane so that uniform motion is transmitted by the joint.

Figure 5:
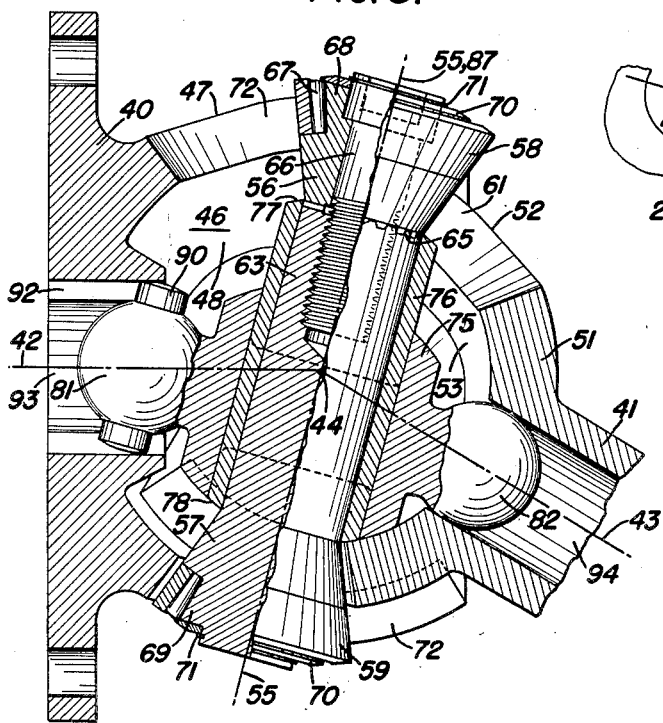
Fig. 5 is a part axial section, part elevational view of a universal joint constructed according to one embodiment of the present invention.

Member 75 can be kept in the proper turning position in which all four sides of the hole 80 are parallel to the roller axis 55 by a pin 90 (Fig. 5). This pin is secured to the spherical portion 81 and passes through a hole provided therein. Its axis passes through the center 83 of the spherical portion 81. The pin is parallel to the hole 80 and to the roller axis 55. It engages a pair of diametrically opposite plane-sided slots 92 which are formed like keyways in the central bore 93 of the member 40. These slots 92 compel the pin axis to stay in the same axial plane as the roller axis 55. The ball portion 82 seats in the central bore 94 of the element 41.

Seals of conventional construction may be used to protect the joint against entry of dust and to retain the lubricant therein. These form no part of the invention and are not shown.

The element 40 contains a pair of diametrically opposite slots 96 as best shown in Fig. 7. They are preferably broached and have parallel plane sides 97. They permit alignment of the shortened front end portions of the prongs 46 with the grooves 61 in the arms 51 of the mating element 41 so that the parts may be assembled together. The element 41 has corresponding grooves 98 (Fig. 6) with straight sides 99. Element 40 contains similar slots 98 (Fig. 6) for assembly and further to provide clearance for the member 75.

In Fig. 9 I have shown a modification of the invention as applied to a universal joint of the axially free type. In this case one element 100 of the joint is axially displaceable. The mating element 101 is like the element 41 of the previously described embodiment of the invention.

In this modification a single roller axis 129 is used. Motion between the two end elements 100 and 101 is transmitted through two pairs of rollers 102, 103, 110, 111.

The rollers 102 and 103 are similar to the rollers 56 and 57. The roller 103 is integral with a rod 104 and the roller 102 is connected with the rod rigidly through the face clutch 105 and the bolt 106 that threads into the rod. The rollers 102 and 103 engage in the grooves 108 of the prongs 109 of the end member 101.

In place of the outer conical rollers 58 and 59, however, there are employed in this embodiment of the invention outer rollers 110 and 111 which are cylindrical. These rollers are journalled on needle bearings 113 on hub portions of the tapered rollers 102 and 103. The rollers 110 and 111 are held against axial outward displacement by disks 115, which are secured in position by snap rings 116. The cylindrical rollers 110 and 111 engage in slots 118 formed in the prongs 119 of end member 100.

The axis 129 of the rollers 102, 103, 110, 111 is held in the bisecting plane by members 120 and 121 which are similar to members 75 and 76. The end member 100 is similar to the end member 40 differing from it only in the shape of the roller grooves and in its inside surface. This surface may be composed of two spherical portions 122 and 123. The forward spherical portion is centered at 125. The rear spherical portion is centered at 126. The distance 125—126 is the total amount of axial freedom permitted by the joint. The two inside spherical portions are connected by a short cylindrical surface. They match the outside spherical surface 127 of the element 101. That is, their sphere radii are substantially the same. The inside spherical surfaces serve as stops and prevent the joint from coming apart in handling. The joint can be taken apart only after separating the rollers 102 and 103 by unscrewing the bolt 106.

The grooves 118 of the member 100 have parallel plane sides. They constrain the rollers 110 and 111 so that their axis 129 remains in an axial plane of the element 100. Their function is the same as the function of the conical grooves 72 of element 40, but the plane sides of the grooves 118 function correctly at all axial positions of the element 100.

In both described embodiments of the invention the two coaxial adjacent rollers 56 and 58, or 57 and 59, or 102 and 110 or 103 and 111 are rotatable relative to each other so that pure rolling is attained. The outer roller is mounted on the inner roller; and simplicity is achieved by directly connecting the two inner rollers thereby reducing the number of bearings.

A further embodiment of the invention is illustrated in Figs. 10 to 13 inclusive. Here, one end element is denoted at 130 and the other at 131. The end 131 is integral with one of the shafts connected by the joint. The other end element 130 is secured by screws 132 to the other shaft 133.

In this embodiment of the invention a plurality of roller axes are used, namely two. One roller assembly has its axis at 135. The other roller assembly in this view has its axis at 136 perpendicular to the axis 135. The first assembly comprises coaxial inner rollers 137 which are rigidly connected together and coaxial outer rollers 138 which are journalled by means of tapered pin bearings 139 on the hub portions of rollers 137. The other roller assembly comprises two inner rollers 142 (Fig. 12) which are integral with a ring shaped member 143 through which the rod 140, that carries the other roller assembly, extends. The large central opening 145 of the ring 143 permits of sufficient turning motion of the assembly for the required rolling motion. Outer rollers (not shown) are mounted rotatably on the hub portions 146 of rollers 142 by means of anti-friction bearings similar to the embodiments of the invention previously described. Sleeves 148 (Fig. 10) of "neoprene" or other suitable material unaffected by oil and grease are secured to the rod 140 of the inner assembly to provide stops for the turning motion about the axis 136. These stops are engaged by the conical surfaces 149 of the ring 143.

The end element 130, like element 40 contains a working portion bounded by an outer spherical surface 150 and an inner spherical surface 151. The latter matches the outer spherical surface 152 of the mating end element 131. The end element 131 has an inner spherical surface 153. All of said spherical surfaces are centered at 155 which is the intersection point of the axes 156 and 157 of the two end elements. The ring member 143 has an outside spherical surface 158 (Fig. 12) which engages the inside spherical surface 153 of the end member 131. Thus the roller assembly carried by the ring member 143 is centered.

The inside spherical surface 153 is extended beyond the end member 131 through a cap 159 (Fig. 10) which is screwed onto the prongs of the element 131 and engages the internal threaded portions 160 at the extreme end of the prong portion 161 of the element 131. The cap 159 contains holes 163 for application of a wrench. Its outside surface 152' is a continuation of the spherical surface 152 of the element 131. It also engages the spherical surface 151 of the element 130.

The slots provided in the elements 130 and 131 for the rollers are exactly like the roller slots of the elements 40 and 41 of Figs. 5 to 8. In the present case, however, there are four roller slots in each element instead of two. These are equally spaced about the axis of their element and constrain the roller axes to stay in axial planes. Pure rolling takes place between the rollers and the substantially conical ways formed by the sides of the slots or grooves in which the rollers engage.

To transmit uniform motion, means are provided to keep the roller axes always in the plane which bisects the angle between the axes 156 and 157 and which passes through the center 155. As the central portion of the joint is already filled up, a novel bisector element is used. This bisector element applies its forces at a maximum distance from the center 155 and therefore operates with reduced loads, thus insuring minimum wear.

Figure 10:
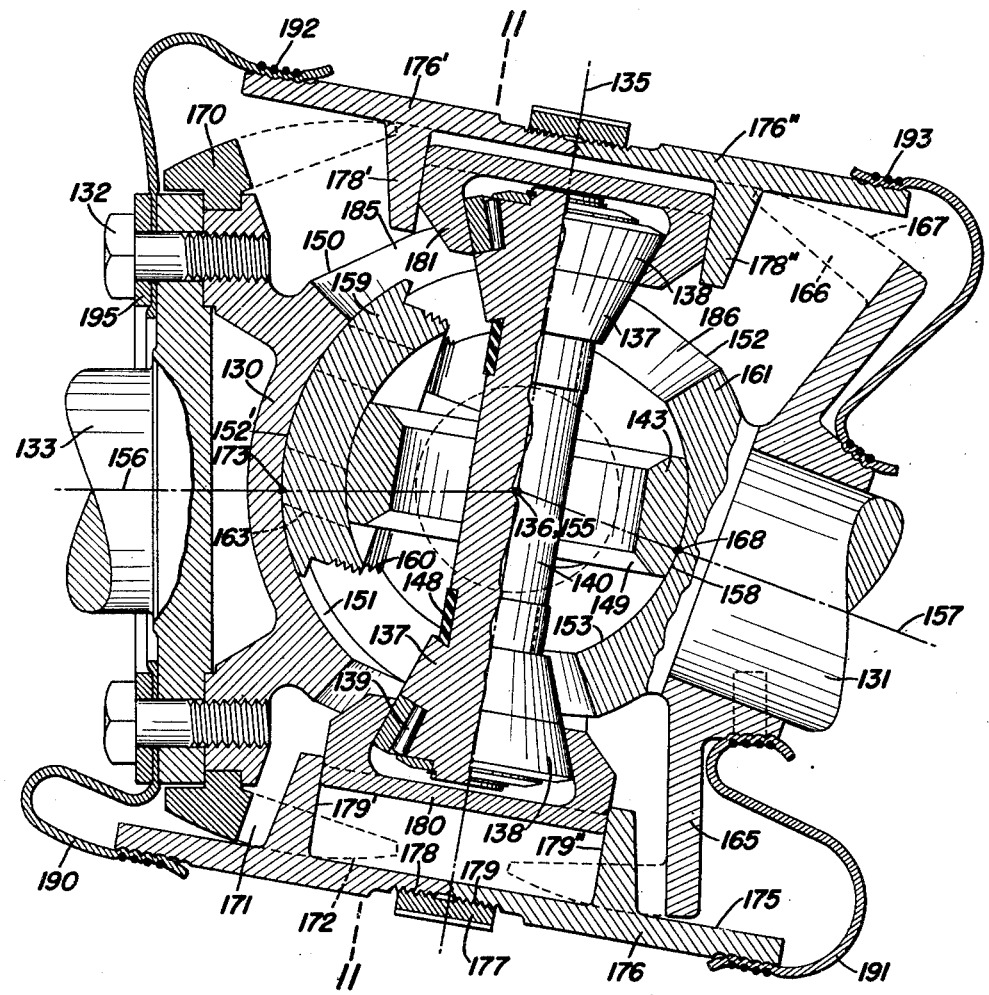
Fig. 10 is a part axial sectional view, part elevation of a joint made according to a still further embodiment of the invention.
Figure 13:
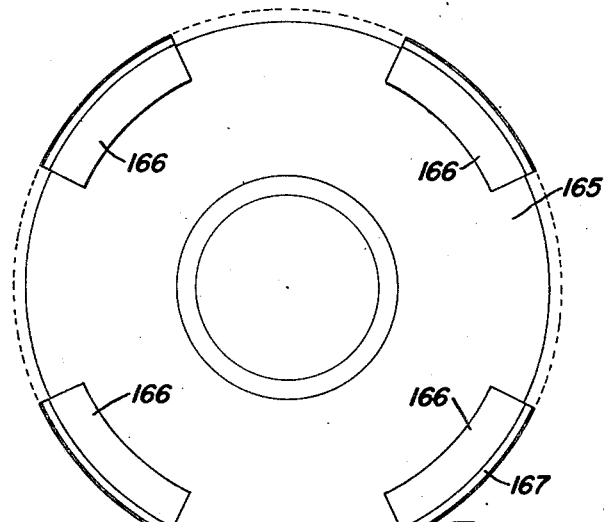
Fig. 13 is an axial view of one of the centering members of this joint.

The end element 131 has a member 165 rigidly secured to it (Figs. 10 and 13). This member has four projections 166 which extend generally axially. The outside surfaces 167 of these projections are part of a spherical surface which is centered at 168 on axis 157. Rigidly secured to the end element 130 is another member 170 also having four generally axially extending projections 171. The outside surfaces 172 of these projections lie in a spherical surface centered at 173 on axis 156. The two spherical surfaces 172 and 167 have equal radii and their centers are at the same distance from the center 155.

Figure 11:
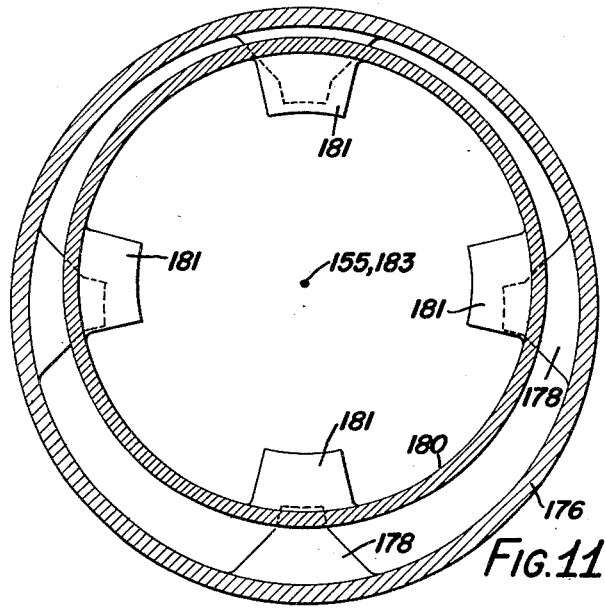
Fig. 11 is a section on the line 11—11 of Fig. 10 on a somewhat reduced scale.
Figure 12:
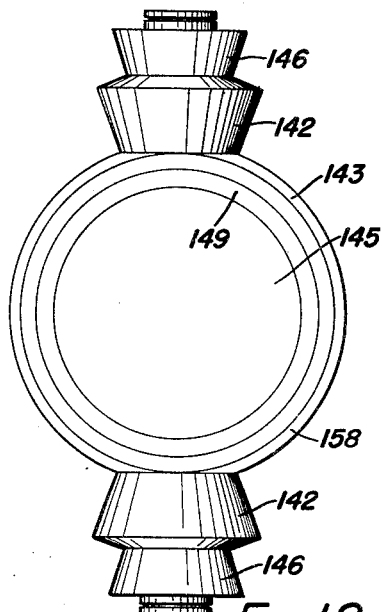
Fig. 12 is a side elevation of one of the roller carriers of the joint of Fig. 10.

The spherical surfaces 167 and 172 are engaged by the inside cylindrical surface 175 of a sleeve 176. This sleeve is made in two parts 176' and 176'' which are rigidly connected by a ring 177. This ring has two threaded portions 178 and 179 of opposite hand which engage threads of corresponding opposite hands provided on two parts of the sleeve 176 so that the two sleeve portions may be drawn together. Each of the two parts 176' and 176'' of sleeve 176 contains four inward projections denoted 178' and 178'', respectively, that are equi-angularly spaced, as seen in Fig. 11. These projections have parallel plane sides 179' and 179'', respectively (Fig. 10), facing each other and perpendicular to the axis of the sleeve 176. Mounted between the sides 179' and 179'' is a cage member 180.

The cage member is movable relative to the sleeve 176 in a radial plane, being guided by the plane sides 179' and 179'' of the projections 178' and 178''. The cage member 180 is provided with four inwardly extending pairs of projections 181 whose opposite sides engage and fit the outer rollers 138 along the profiles of these rollers. The side surfaces of these projections are conical surfaces coaxial with the axis 183 of the cage.

After assembly, the cage axis passes through the center 155. The inward projections 181 of the cage and 178', 178'' of the sleeve are aligned with the roller grooves 185 and 186 of the end elements 130 and 131, so that the outer rollers 138 are engaged both by the sides of grooves 185 and the projections 181. The projections 166 and 171 with the spherical outside surfaces 167 and 172 reach into the spaces between the inward projections 178'' and 178'.

It is seen that the sleeve 176 is always perpendicular to the bisecting plane since it rests on equal spherical surfaces which are equally distant from the center 155. The sleeve keeps the cage member 186 in the bisecting plane; and the cage, in turn, keeps the rollers in the bisecting plane so that uniform motion is assured.

Flexible oil seals 190 and 191 may be secured to the sleeve 176 by wires 192 and 193 in known manner. At its inner end the seal 190 is secured to the flange of the shaft 133 by a disc 195 through the screws 132. The seal 191 is secured at its inner end on the hub of the member 165. With this arrangement the seals also help to keep the sleeve in its proper turning position.

Figure 14:
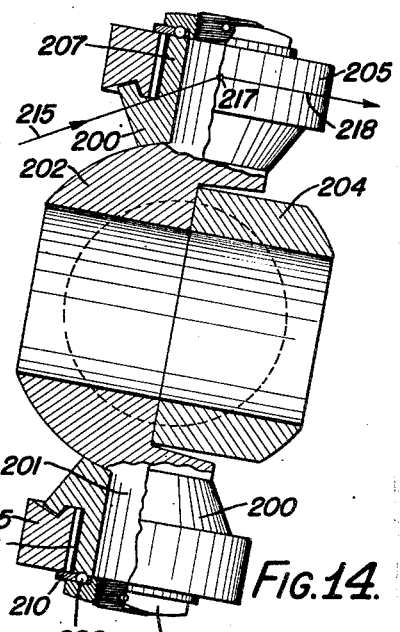
Fig. 14 is a part axial section, part view, of a further form of coaxial roller assembly for universal joints made according to this invention.
Figure 15:
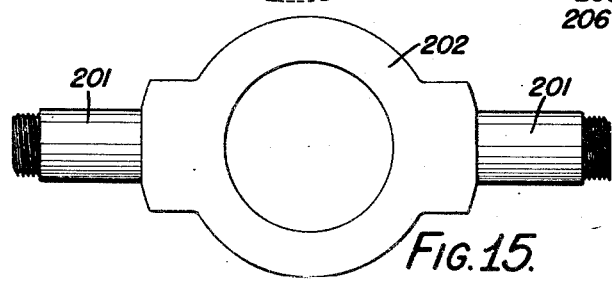
Fig. 15 is a side elevation of the roller supporting member used in the embodiment of the invention illustrated in Fig. 14.

The invention is not confined to cases where the inner rollers are rigidly secured to each other. Figs. 14 and 15 illustrate an embodiment where the inner coaxial rollers are separate and separately mounted. Fig. 14 shows the roller assembly only. The coaxial rollers 200 of one assembly are carried by a carrier 202. Those of the other roller assembly are carried by a carrier 204. The two carriers are alike. Each carrier has a ring portion from which project two diametrically opposite pins 201 which are coaxial. On each pin there is rotatably mounted the roller 230. It is of conical shape. On the hub portion 207 of each roller 200 there is mounted an outer cylindrical roller 205 by means of needle bearings 206. A row of balls 208 engages the outer end of the hub 207 to form a thrust bearing. The outer race of this bearing is on a nut 209 which is rigidly secured to the pin or stud 201 and which is prevented from working loose. A ball cage 210 also keeps the needles 206 in the roller 205 in their proper axial position.

With the illustrated structure no anti-friction bearing is needed between the pins 201 and the inner rollers 200. There is hardly any load transmitted between the two. Load applied to an inner roller by its race gives a resultant which extends in the direction 215. This line intersects the axis of the roller at substantially the same point 217 at which the load 218 intersects it. The latter is the load transmittted by the outer coaxial roller to its race. The only load to be taken care of then in mounting the inner roller is the axial thrust. The thrust bearing takes care of that load. The same conditions exist, also, when the load is transmitted in the opposite direction. In either case, the pin 201 carries practically no radial load and serves for holding only. Except for the obviously modified shape of the roller groove profiles which are required to match the profiles of the rollers shown, each part can be constructed as in the embodiment shown in Figs. 10 to 13 inclusive. The cage member would then be provided with plane sides engaging the cylindrical rollers 205.

The invention may be applied also when coaxial adjacent rollers are directly mounted on the carrier or its pins.

It should be understood that any of my uniform motion joints may be used not only for transmitting uniform motion between two rotating shaft elements but also in cases where one element is held stationary. In this case, the other element performs a wabble motion which at any given shaft angularity is a uniform planetary motion. This motion is as though a bevel gear coaxial with the movable end element were rolling on a stationary bevel gear having an equal number of teeth and coaxial with the stationary end element. Unlike the gear connection, however, a connection by a universal joint permits changes in shaft angularity regardless of whether one element is stationary or whether both are movable.

While the invention has been described in connection with different embodiments thereof, it will be understood then that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A universal joint comprising two end elements which are rotatable relative to one another about intersecting axes and which have grooved portions of different diameters, respectively, the grooved portion of one element lying within the grooved portion of the other element, two coaxial rollers engaging, respectively, in the grooves of said two elements, one of said rollers being mounted directly on the other coaxially of the other to rotate relative to the other and to transmit the driving load between said two end elements directly from one roller to the other, and means connected to said two end elements for maintaining the axis of said rollers in a plane which passes through the point of intersection of the axes of the two end elements and which bisects the angle between said axes.

2. A universal joint comprising two end elements which are rotatable relative to one another about intersecting axes and which have grooved portions of different diameters, respectively, the grooved portion of one element lying within the grooved portion of the other element and the grooved portions of each element having two diametrically opposed grooves therein, a pair of identical, coaxial, diametrically opposed rollers rigidly connected to one another and engaging the diametrically opposite grooves of the grooved portion of smaller diameter, and a pair of diametrically opposite rollers mounted coaxial with the first-named rollers to rotate on journals integral with the first-named rollers, said last-named pair of rollers engaging in the diametrically opposite grooves of the grooved portion of larger diameter.

3. A universal joint comprising two end elements which are rotatable relative to one another about intersecting axes and which have grooved portions of different diameters, respectively, the grooved portion of one element lying within the grooved portion of the other element, the grooved portion of each element having two diametrically opposed grooves therein, the grooves of the grooved portion of smaller diameter having opposed sides which are conical, a pair of identical, coaxial, diametrically opposed, conical rollers rigidly connected to one another and engaging the diametrically opposite grooves of the grooved portion of smaller diameter, and a pair of diametrically opposite rollers mounted coaxial with the first-named rollers to rotate on the first-named rollers, said last-named pair of rollers engaging in the diametrically opposite grooves of the grooved portion of larger diameter.

4. A universal joint comprising two end elements which are rotatable relative to one another about intersecting axes and which have grooved portions of different diameters, respectively, the grooved portion of one element lying within the grooved portion of the other element, the grooved portion of each element having two diametrically opposed grooves therein, whose opposed sides are conical, a pair of identical, coaxial, diametrically opposed, conical rollers rigidly connected to one another and engaging the diametrically opposite grooves of the grooved portion of smaller diameter, and a pair of diametrically opposite, conical rollers mounted coaxial with the first-named rollers to rotate on the first-named rollers and engaging in the diametrically opposite grooves of the grooved portion of larger diameter.

5. A universal joint comprising two end elelements which are rotatable relative to one another about intersecting axes and which have grooved portions of different diameters, respectively, the grooved portion of one element lying within the grooved portion of the other element, the grooved portion of each element having two diametrically opposed grooves therein, the grooves of the grooved portion of smaller diameter having opposed sides which are conical, the grooves of the grooved portion of larger diameter having parallel plane sides, a pair of identical, coaxial, diametrically opposed, conical rollers rigidly connected to one another and engaging the diametrically opposite grooves of the grooved portion of smaller diameter, and a pair of diametrically opposite, cylindrical rollers mounted coaxial with the first-named rollers to rotate on the first-named rollers and engaging in the diametrically opposite grooves of the grooved portion of larger diameter.

6. A universal joint comprising two end elements having intersecting axes, said end elements having, respectively, grooved portions of different diameters, the grooved portion of each element having two diametrically opposed grooves therein, the grooved portion of smaller diameter having a spherical outside surface, the grooved portion of larger diameter having a spherical inside surface of equal radius to said spherical outside surface and adapted to contact therewith, the grooves of the grooved portion of smaller diameter having opposed sides which are conical, a pair of coaxial, substantially conical inner rollers rigidly connected with each other and engaging the diametrically opposed grooves of the grooved portion of smaller diameter, a pair of outer rollers mounted coaxial with said inner rollers to turn relative thereto, said outer rollers engaging the diametrically opposite grooves of the grooved portion of larger diameter, and means connected to said two end elements for maintaining the axis of said rollers in a plane which bisects the angle between the intersecting axes.

7. A universal joint comprising a pair of relatively rotatable end elements which have intersecting axes, each of said end elements having a grooved portion with more than three generally axially extending grooves, the grooved portion of one element lying inside the grooved portion of the other element, a plurality of roller assemblies extending between said grooved portions, each of said assemblies having a pair of coaxial inner rollers rigidly connected with each other and a pair of outer rollers rotatably mounted coaxially on said inner rollers, the inner rollers engaging in the grooves of the grooved portion of one element and the outer rollers engaging in the grooves of the other element, and means connected to said two end elements for maintaining the axes of said roller assemblies in a plane which bisects the angle between the axes of the end elements.

8. A universal joint comprising a pair of relatively rotatable end elements which have intersecting axes, each of said elements having a grooved portion with four generally axially extending grooves, the grooved portion of one element lying inside the grooved portion of the other element, two roller assemblies extending between said grooved portions, each of said roller assemblies comprising a pair of coaxial, inner rollers rigidly connected to each other, and a pair of outer rollers rotatably mounted coaxially on said inner rollers, the inner rollers of one assembly being connected to a ring-shaped support, the inner rollers of the other assembly being connected to a rod which extends through said ring-shaped support, the inner rollers engaging in the grooves of one end element and the outer rollers engaging in the grooves of the other end element, and means connected to said two end elements for maintaining the axis of the rollers in a plane which bisects the angle between the axes of said elements.

9. A universal joint comprising a pair of relatively rotatable end elements having intersecting axes, each of said end elements having grooved portions with four grooves therein which extend along axial planes, the grooved portion of one element lying inside the grooved portion of the other element, two roller assemblies extending between said grooved portions, one of said roller assemblies comprising a rod having two inner rollers mounted thereon, the other of said roller assemblies comprising a ring-shaped support, through which said rod passes and which has two inner rollers mounted thereon, said pairs of inner rollers engaging in the grooves of the inside grooved portion, an outer roller rotatably mounted on each inner roller, said outer rollers engaging in the grooves of the outside grooved portion, said outside grooved portion having a spherical inside surface and said inside grooved portion having a spherical outside surface fitting in and contacting the inside surface of the outside grooved portion, a sleeve surrounding said grooved portions and having a cylindrical inside surface, a pair of parts secured to the end members, each part having projections formed thereon which have spherical outside surfaces which engage the inside cylindrical surface of the sleeve and which are centered on the axis of one end element, a cage, means inside said sleeve for engaging and guiding said cage so that it moves in a radial plane, and said cage having projections thereon which engage the outer rollers.

10. A universal joint comprising two relatively rotatable end members having intersecting axes, each end member having arms that are grooved generally axially, the arms of one end member fitting inside the arms of the other end member and having outside spherical surfaces that fit inside spherical surfaces formed on the inside surfaces of the arms of said other member, a rod member, a pair of inner rollers mounted on said rod member and engaging in the grooves of the inside arms, a pair of outer rollers rotatably mounted on the inner rollers and coaxial therewith, said outer rollers engaging in the grooves of the outside arms, and means for maintaining the axis of the rollers in a plane which bisects the angle between the axes of said elements comprising a sleeve mounted on said rod member and having parallel plane sides, a guide member within which said sleeve slides having a rectangular hole to engage and fit the parallel sides of said sleeve, said guide member having spaced ball portions seating in bores of both of said end members, and means for holding said guide member against rotation relative to one end member.

11. A universal joint comprising two relatively rotatable end members having intersecting axes and central bores, each end member having two diametrically disposed arms that are grooved generally axially, the arms of one end member fitting inside the arms of the other end member and having a common outside spherical surface that fits inside the common inside spherical surface formed on the inside surfaces of the arms of said other end member, said two spherical surfaces being centered at the point of intersection of the axes of the end members, a rod, a pair of inner rollers secured to said rod against rotation relative thereto and engaging in the grooves of the inside arms, a pair of outer rollers rotatably mounted on the inner rollers and coaxial therewith, said outer rollers engaging in the grooves of the outside arms, and means for maintaining the axis of the rollers in a plane which bisects the angle between the axes of said end members comprising a sleeve mounted on said rod and having parallel plane sides, a guide member within which said sleeve slides having a rectangular hole to engage and fit the parallel sides of said sleeve, said guide member having a ball portion at one side seating in the bore of one end member and having a ball portion at its diametrically opposite side seating in the bore of the other end member, and a pin secured in the latter ball portion and engaging in axial grooves in said other end member to hold said guide member against rotation relative to said other end member.

12. A universal joint comprising two relatively rotatable end members having intersecting axes, each end member having two diametrically opposed arms that have generally axially extending grooves, the arms of one end member fitting inside the arms of the other end member and having a common outside spherical surface centered at the point of intersection of the axes of said end members, portions of the inside surfaces of the outside arms lying in two separate spherical surfaces whose radii are equal to the radius of said first-named common outside spherical but whose centers are offset from one another and from the point of intersection of the axes of said end members, a rod, a pair of conical inner rollers secured to said rod against rotation relative thereto and engaging in the grooves of the inside arms, a pair of cylindrical outer rollers rotatably mounted on the inner rollers and coaxial therewith and engaging in the grooves of the outside arms, and means connected to said two end elements for maintaining the axis of the rollers in a plane which bisects the angle between the axes of said end members.

13. A universal joint comprising two relatively rotatable end members having intersecting axes, each end member having a grooved portion with two diametrically opposed generally axially extending grooves, the grooved portion of one end member fitting inside the grooved portion of the other end member and having an outside spherical surface centered at the point of intersection of the axes of said end members, the outer grooved portion having an inside surface lying in two separate spherical surfaces whose radii are equal to the radius of said first-named outside spherical surface but whose centers are offset from one another and from the point of intersection of the axes of said end members, a rod, a pair of conical inner rollers secured to said rod against rotation relative thereto and engaging in the grooves of the inside grooved portion, a pair of cylindrical outer rollers rotatably mounted on the inner rollers and coaxial therewith and engaging in the grooves of the outside grooved portion, and means for maintaining the axis of the rollers in a plane which bisects the angle between the axes of said end members, comprising a sleeve mounted on said rod and having parallel plane sides, a guide member within which said sleeve slides having a rectangular hole to engage and fit the parallel sides of said sleeve, said guide member having spaced ball portions seating in bores formed centrally in the two end members.

14. A universal joint comprising two relatively rotatable end members having intersecting axes, each end member having a grooved portion with two diametrically opposed, generally axially-extending grooves, the grooved portion of one end member fitting inside the grooved portion of the other end member, the outer grooved portion having an inside spherical surface adapted to engage and receive an outside spherical surface formed on the inner grooved portion, the grooves of the inner grooved portion having opposed sides which are conical, a rod member, a pair of opposite, coaxial, conical inner rollers mounted on said rod member, the large ends of said rollers being disposed at the outside, and a pair of outer rollers journalled on the inner rollers coaxially therewith to transmit the driving load between said end members directly from the outer rollers to the inner rollers and vice versa, the inner rollers engaging in the grooves of the inner grooved portion and the outer rollers engaging in the grooves of the outer grooved portion.

15. A universal joint comprising two relatively rotatable end members having intersecting axes, each end member having a grooved portion with two diametrically-opposed, generally axially-extending grooves, the grooved portion of one end member fitting inside the grooved portion of the other end member, the outer grooved portion having an inside spherical surface adapted to engage and receive an outside spherical surface formed on the inner grooved portion, a rod, a pair of opposite, coaxial, conical inner rollers secured to said rod against rotation relative thereto, the large ends of said rollers being disposed at the outside, and a pair of conical outer rollers journalled on the inner rollers coaxially therewith, the inner rollers engaging in the grooves of the inner grooved portion and the outer rollers engaging in the grooves of the outer grooved portion, all said rollers having a common cone apex.

16. A universal joint comprising two relatively rotatable end members having intersecting axes, each end member having a grooved portion with four equi-angularly spaced grooves, the grooved portion of one end member fitting inside the groove portion of the other end member, the outer grooved portion having an inside spherical surface adapted to engage and receive an outside spherical surface formed on the inner grooved portion, a ring-shaped support, a pair of diametrically opposite coaxial, inner rollers secured to said support and engaging in diametrically opposite grooves of the inner grooved portion, a pair of outer rollers journalled on said two inner rollers coaxially therewith to transmit the driving load between said two end members directly from the outer rollers to the inner rollers and vice versa, said outer rollers engaging in diametrically opposite grooves of the outer grooved portion, and two separate pairs of coaxial inner rollers and outer rollers engaging the other grooves of said inner and outer grooved portions, the last-named outer rollers being journaled on the last-named inner rollers.

17. A universal joint comprising two relatively rotatable end members having intersecting axes, each end member having grooved portions with four equi-angularly spaced grooves, the grooved portion of one end member fitting inside the grooved portion of the other end member, the outer grooved portion having an inside spherical surface adapted to engage and receive an outside spherical surface formed on the inner grooved portion, a ring-shaped support, a pair of diametrically opposite coaxial, inner rollers mounted on said support and engaging in diametrically opposite grooves of said inner grooved portion, an outer roller journalled on each of said inner rollers coaxially therewith to transmit the driving load between said two end members directly from the outer rollers to the inner rollers and vice versa, said outer rollers engaging in diametrically opposite grooves of said outer grooved portion, a second support whose axis intersects the axis of said ring-shaped support, and two separate pairs of coaxial inner rollers and outer rollers mounted on said support and engaging the other grooves of said inner and outer grooved portions, the last-named outer rollers being journaled on the last-named inner rollers, all of said inner rollers being conical and having their large ends at their outsides.

18. A universal joint comprising two relatively rotatable end members having intersecting axes, each end member having a grooved portion with two diametrically opposed grooves extending along axial planes, the grooved portion of one end member fitting inside the grooved portion of the other end member, the outer grooved portion having an inside spherical surface adapted to engage and receive an outside spherical surface formed on the inner grooved portion, a support having a pair of coaxial pin portions at opposite ends thereof, a pair of inner rollers rotatably mounted on said pin portions and engaging in the grooves of the inner grooved portion, and a pair of outer rollers mounted coaxially with said pin portions to turn relative thereto and relative to the inner rollers and engaging in the grooves of the outer grooved portion, the rollers of one of said pairs being conical.

19. A universal joint comprising two relatively rotatable end members having intersecting axes, each end member having a grooved portion with two grooves extending along axial planes, the grooved portion of one end member extending inside the grooved portion of the other end member, a rod member, a pair of inner rollers rigidly secured to said rod member, at least one of said inner rollers being detachably secured thereto, and a pair of outer rollers mounted on said inner rollers coaxially therewith to turn thereon, the rollers engaging with said grooves.

ERNEST WILDHABER.

References Cited in the file of this patent
UNITED STATES PATENTS

| Number | Name | Date |
| --- | --- | --- |
| 754,751 | Cowing | Mar. 15, 1904 |
| 1,625,410 | De Ram | Apr. 19, 1927 |
| 2,051,248 | Dunn | Aug. 18, 1936 |
| 2,236,633 | Wingquist | Apr. 1, 1941 |
| 2,263,279 | Seib | Nov. 18, 1941 |
| 2,293,717 | Dodge | Aug. 25, 1942 |